2,867,593
COATING VEHICLE

Russell T. Dean, Stamford, Conn., and Rupert J. Schefbauer, Hasbrouck Heights, N. J., assignors to Interchemical Corporation, New York, N. Y., a corporation of Ohio No Drawing. Application October 20, 1954
Serial No. 463,619

3 Claims. (Cl. 260—22)

This invention is in the field of synthetic resins of the type used for film forming compositions, and aims to provide a liquid vehicle for film forming compositions characterized by good drying properties, excellent color retention and fairly good alkali resistance. Essentially, our new vehicles comprise the reaction products of a monohydric alcohol obtained by the condensation of cyclopentadiene and allyl alcohol, a polyhydric alcohol with three or more hydroxyl groups, drying oil fatty acids and an alpha, beta unsaturated dicarboxylic acid such as maleic or fumaric acids, in certain definite properties.

In many applications in the paint and printing ink industries, formulators need an economical vehicle similar to a drying oil in that it is essentially 100% non-volatile and liquid, yet which dries rapidly on the application of heat and which at the same time is resistant to discoloration or heating.

We have discovered that such a vehicle can be produced by reacting an alpha beta unsaturated dicarboxylic acid (such as maleic anhydride or fumaric acid) with an alkyd resin forming polyhydric alcohol, having at least 3 hydroxyl groups, 2-5 endomethylene Δ-3 tetrahydrobenzyl alcohol (the allyl alcohol adduct of cyclopentadiene) and drying oil fatty acids, using from about 0.8 to 1.1 moles of monohydric alcohol per mol of dibasic acid, and a total of from about 1.5 to 3.0 moles of monohydric alcohol and drying oil acid per mol of dibasic acid. Most preferably, there is a slight excess of hydroxyl in the compound, and the fatty acid comprises from 40% to 55% of the total composition.

Within this range, the products obtained on condensation are oily liquids, which dry very rapidly on heating in their films, and which are remarkably resistant to discoloration when compared with hitherto known products exhibiting similar drying properties.

As typical of our invention, we prepared a series of vehicles, using the following techniques.

*Technique A—With fatty acids.*—The fatty acid and polyhydric alcohol were charged into a three necked flask equipped with agitator, Dean-Starke trap and condenser, thermometer and $CO_2$ influx tube and heated to 230° C. as rapidly as possible. The reaction mixture was held at this temperature for an acid number of 3–4, then lowered to 125° C., and the maleic anhydride was added. The temperature was raised to a maximum of 150° C. and held for 15 minutes. Cyclopentadiene-allyl alcohol adduct and 3% xylene (based on total weight) were charged and the batch was esterified azeotropically at a top temperature of 195° C. At an acid number of 18–20 the reaction was stopped and the xylene was vacuum stripped off.

*Technique B—With oils.*—The oil and glycerol were charged into a flask (equipped as described above) and heated to 150° C. The catalyst, litharge at a .025% concentration based on weight of materials was added and the temperature raised to 230° C. The reaction was maintained at this temperature until solubility at a 3–7 ratio (product to methanol) was obtained. Temperature was dropped to 125° C. and the balance of the reaction was carried out as described in Technique A, adding maleic anhydride; raising the temperature to 150° C. etc.

A group of esters was prepared, using Technique B, and the following ingredients, in the molar proportions:

| Example | Soya oil | 100% glycerol | Maleic anhyd. | Cyclopentadiene allyl alcohol adduct | Viscosity, 100% solids, mu |
|---|---|---|---|---|---|
| 1 | 1.0 | 2.0 | 6.0 | 6.0 | 496 |
| 2 | 1.0 | 2.0 | 6.0 | 6.6 | 2,480 |
| 3 | 2.0 | 1.0 | 3.0 | 3.3 | 128 |
| 4 | 0.5 | 1.0 | 2.5 | 2.2 | 548 |
| 5 | .585 | 1.17 | 2.64 | 2.2 | 497 |

Viscosities were obtained on a tackmeter (Green U. S. P. 2,345,968 issued April 4, 1944) at 30° C.

Example 2 was bodied to get higher viscosity. However, it dilutes poorly with low solvency petroleum solvents.

Example 3 yields films which are soft and oil like.

Examples 1, 4 and 5 are all fast drying and non-discoloring, and are excellent vehicles for surface coating work. The product of Example 5 was repeated, using Technique A—the fatty acid method. A somewhat lower viscosity (about 200 mu) was obtained, with the desired low acid number of about 20.

A series of experiments was run, repeating Example 5, by Technique A, but using excess glycerol in an attempt to lower the viscosity at equivalent acid number. It was found that the viscosity went down with the use of up to about 10.0–12.5% excess glycerol without serious impairment of film properties. Beyond this figure, the reduction in viscosity was not sufficient to make the cost of additional glycerol worthwhile.

A further series was run, using Technique A, with gradually increasing oil length, as follows:

| Example | Soya fatty acids (mols) | Percent fatty oil acid | Glycerol (mols) | Maleic anhyd. (mols) | Cyclo adduct (mols) | Visc. | Acid No. |
|---|---|---|---|---|---|---|---|
| 5A | 1.75 | 40 | 1.75 | 2.64 | 2.2 | 200 | 20 |
| 6 | 1.95 | 43.5 | 1.75 | 2.54 | 2.2 | 110 | 23 |
| 7 | 2.15 | 46 | 1.75 | 2.44 | 2.2 | 120 | 20 |
| 8 | 2.34 | 48.6 | 1.75 | 2.35 | 2.2 | 20 | 16 |
| 9 | 2.55 | 51.0 | 1.75 | 2.24 | 2.2 | 14 | 16 |

This entire group of vehicles gives excellent results with dry slowing up somewhat in Examples 8 and 9, but still very satisfactory. The viscosities of Examples 6 and 7 can be lowered by using up to 10 to 12.5% excess glycerol.

When more highly unsaturated fatty acids are substituted for soya fatty acids, higher viscosity is obtained at the same oil length, due to additional reaction of the Diels-Alder type between the maleic anhydride and the conjugated double bonds in the oils. Hence it is desirable to add excess glycerol and work at somewhat higher oil lengths. Typical examples are the following, made by using Technique A.

*Examples using linseed fatty acids*

| Example | Linseed fatty acids (mols) | Percent linseed fatty acids | Glycerol (mols) | Maleic anhyd. (mols) | Cyclo adduct (mols) | Visc., mu | Acid No. |
|---|---|---|---|---|---|---|---|
| 10 | 2.0 | 62 | 1.2 | 1.0 | 1.0 | 22 | 8 |
| 11 | 2.0 | 59 | 1.4 | 1.25 | 1.0 | 19 | 17 |
| 12 | 2.0 | 56 | 1.596 | 1.50 | 1.0 | (1) | ------ |

1 Gelled while stripping.

*Examples using dehydrated castor oil fatty acids*

| Example | Dehydrated castor oil fatty acids (mols) | Percent dehydrated castor oil fatty acids | Glycerol (mols) | Maleic anhyd. (mols) | Cyclo adduct (mols) | Visc., mu | Acid No. |
|---|---|---|---|---|---|---|---|
| 13 | 2.0 | 62 | 1.21 | 1.0 | 1.0 | 58 | 28 |
| 14 | 1.5 | 56 | 1.0 | 1.0 | 1.0 | 56 | 21 |
| 15 | 1.25 | 51 | 1.0 | 1.125 | 1.0 | (1) | 30 |
| 16 | 1.0 | 44 | 1.0 | 1.25 | 1.0 | (1) | 24 |

[1] Very high, had to be cut.

These vehicles were more expensive than their soya oil counterparts, and more difficult to control.

By substituting a saturated dibasic acid for part of the maleic anhydride, the reaction becomes more controllable. Thus, we made

| Ex. | Dehydrated castor oil fatty acids (mols) | Percent dehydrated castor oil fatty acids | Glycerol (mols) | Cyclo adduct (mols) | Maleic anhyd. (mols) | Adipic acid (mols) | Visc., mu | Acid No. |
|---|---|---|---|---|---|---|---|---|
| 17 | 1.75 | 38.7 | 1.75 | 2.2 | 1.98 | .66 | 392 | 23 |
| 18 | 1.75 | 37.8 | 1.75 | 2.2 | 1.32 | 1.32 | 64 | 35 |

It will be seen that the reaction here becomes controllable.

Similarly, it is possible to produce the vehicles with other polyhydric alcohols than glycerol. Any alkyd resin producing polyhydric alcohol may be used. Thus pentaerythritol was used in these vehicles.

| Ex. | Soya fatty acid (mols) | Percent soya fatty acid | Pentaerythritol (mols) | Maleic anhyd. (mols) | Cyclo adduct (mols) | Visc., mu | Acid No. |
|---|---|---|---|---|---|---|---|
| 19 | 1.5 | 35 | 1.1 | 2.5 | 2.75 | 705 | 20 |
| 20 | 1.75 | 41 | 1.1 | 2.25 | 2.5 | 140 | 20 |
| 21 | 2.0 | 47 | 1.1 | 2.0 | 2.2 | 170 | 9 |

All of these were excellent vehicles both for drying and color retention. However, Example 19 was rather too viscous for optimum results in many uses.

Rosin monoglyceride may be substituted for part of the fatty acid glyceride, at the expense of viscosity; otherwise, good dry is obtained—note the following results, using Technique A

| Ex. | Rosin (mols) | Soya fatty acid (mols) | Glycerol (mols) | Maleic anhyd. (mols) | Cyclo adduct (mols) | Visc., mu | Acid No. |
|---|---|---|---|---|---|---|---|
| 22 | .175 | 1.575 | 1.97 | 2.64 | 2.2 | 210 | 20 |
| 23 | .4375 | 1.3125 | 1.97 | 2.64 | 2.2 | 390 | 24 |
| 24 | .875 | .875 | 1.97 | 2.64 | 2.2 | 4,800 | 26 |

We have substituted other alkyd forming polyhydric alcohols for the glycerol and pentaerythritol of the examples; other alkyd forming dibasic acids than adipic for part of the maleic; other alpha beta unsaturated dibasic acids (e. g. fumaric, itaconic) for the maleic anhydride; and other fatty acids for the soya, linseed and dehydrated castor oil fatty acids shown. The greater the reactivity of these materials, the higher will be the viscosity, and the greater must be the fatty acid percentage and the excess hydroxyl to get optimum results.

We claim:

1. A vehicle for the coating industry characterized by rapid dry and good color retention, comprising the product formed by (*a*) reacting an alkyd resin forming polyhydric alcohol having at least three hydroxyl groups with a material of the group consisting of glyceride drying oils and drying oil fatty acids, at a relatively high temperature, to form an ester having free hydroxyl groups and (*b*) reacting the ester so obtained at a substantially lower temperature with an alkyd resin forming dicarboxylic acid consisting essentially of alpha-beta unsaturated acid and a monohydric alcohol which is 2-5 endomethylene Δ-3 tetrahydrobenzyl alcohol, to an acid number below 35, the monohydric alcohol being present in the ratio of 0.8 to 1.1 mols per mol of dibasic acid, and the monohydric alcohol and drying oil acids together being present to a total of about 1.5 to 3.0 mols per mol of dibasic acid.

2. The vehicles of claim 1 in which the reaction product contains a slight excess of hydroxyl, and the fatty acid comprises from 40 to 55% of the total composition.

3. The vehicle of claim 1, in which the polyhydric alcohol is glycerol, and the dicarboxylic acid is maleic anhydride.

References Cited in the file of this patent
UNITED STATES PATENTS
2,557,136    Nichols _____ June 19, 1951